United States Patent
Peleg et al.

(10) Patent No.: US 7,818,297 B2
(45) Date of Patent: Oct. 19, 2010

(54) SYSTEM AND METHOD FOR REFRESHING A TABLE USING EPOCHS

(75) Inventors: Nitzan Peleg, Haifa (IL); Yuval Sherman, Sunnyvale, CA (US); Hansjorg Zeller, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1293 days.

(21) Appl. No.: 10/403,500

(22) Filed: Mar. 31, 2003

(65) Prior Publication Data

US 2004/0193622 A1   Sep. 30, 2004

(51) Int. Cl.
*G06F 7/00* (2006.01)
*G06F 17/00* (2006.01)

(52) U.S. Cl. .................. 707/625; 707/624; 707/610; 707/609

(58) Field of Classification Search .............. 707/2, 707/8, 201, 202, 625, 624, 610, 609, 999.002, 707/999.008, 999.201, 999.202
See application file for complete search history.

(56) References Cited

U.S. PATENT DOCUMENTS

| | | | | |
|---|---|---|---|---|
| 5,485,608 | A * | 1/1996 | Lomet et al. | 707/202 |
| 5,511,190 | A | 4/1996 | Sharma et al. | |
| 5,613,113 | A * | 3/1997 | Goldring | 707/202 |
| 5,717,911 | A | 2/1998 | Madrid et al. | |
| 5,724,570 | A | 3/1998 | Zeller et al. | |
| 5,819,255 | A | 10/1998 | Celis et al. | |
| 5,822,747 | A | 10/1998 | Graefe et al. | |
| 5,991,754 | A * | 11/1999 | Raitto et al. | 707/2 |
| 6,021,405 | A | 2/2000 | Celis et al. | |
| 6,125,360 | A * | 9/2000 | Witkowski et al. | 707/2 |
| 6,134,543 | A * | 10/2000 | Witkowski et al. | 707/2 |
| 6,334,128 | B1 * | 12/2001 | Norcott et al. | 707/5 |
| 6,339,772 | B1 | 1/2002 | Klein et al. | |
| 6,438,741 | B1 | 8/2002 | Al-omari et al. | |
| 6,529,904 | B1 * | 3/2003 | Elsbernd et al. | 707/8 |
| 6,546,402 | B1 * | 4/2003 | Beyer et al. | 707/201 |
| 6,882,993 | B1 * | 4/2005 | Lawande et al. | 707/2 |

OTHER PUBLICATIONS

Nathan Wallace, Installing Oracle 8.0.5 on Red Hat Linux 5.x, Apr. 28, 1999, (http://www.e-gineer.com/v1/instructions/install-oracle805-on-readhat5x.htm).*
Aiken, Peter, "Microsoft Computer Dictionary" 2002, Microsoft Press, 5th Ed., p. 521.*
Naude, Frank, "Oracle FAQ: Glossary of Terms T" Feb. 2002, www.orafaq.com, p. 1-2.*
Blakeley et al., Efficiently Updating Materialized Views, 1986 ACM 0-89791-191-1/86/0500/0061, Data Structuring Group, Department of Computer Science, University of Waterloo, Waterloo, Ontario, N2L 3G1.

* cited by examiner

*Primary Examiner*—Brent Stace

(57) ABSTRACT

The disclosed embodiments relate to a system for refreshing a table to produce a refreshed table. The system may include a refresh log that may contain a plurality of entries that each comprise an epoch identifier. The system may also include a refresh manager that may be adapted to perform a refresh operation on the table using entries that have corresponding epoch identifiers.

30 Claims, 4 Drawing Sheets

| RECORD | TIMESTAMP | UPDATE TYPE | DATA | EPOCH |
|---|---|---|---|---|
| REC 102a | TS 102b | UT 102c | DATA 102d | E 102e |
| REC 104a | TS 104b | UT 104c | DATA 104d | E 104e |
| REC 106a | TS 106b | UT 106c | DATA 106d | E 106e |
| REC 108a | TS 108b | UT 108c | DATA 108d | E 108e |
| REC 110a | TS 110b | UT 110c | DATA 110d | E 110e |
| REC 112a | TS 112b | UT 112c | DATA 112d | E 112e |
| REC 114a | TS 114b | UT 114c | DATA 114d | E 114e |

100

Fig. 2 ized view. In a complex database environment, such as a distributed, shared-nothing database, the log entries that may be used to update a materialized view may include timestamps corresponding to the time at which changes to the base tables of the database were made. The DBMS may use the information contained in the log timestamps to determine which updates should be made to a materialized view. For example, the DBMS may update a materialized view with data contained in all log entries within a specific range of time. To determine which updates to include, the DBMS may employ a range algorithm that determines which log entries to include in a given update or refresh operation.

SYSTEM AND METHOD FOR REFRESHING A TABLE USING EPOCHS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a database system that is implemented in a networked computing environment, each server may have access to only the portion of the database that is stored on its local storage devices. Such a database may be referred to as a "distributed" database because the data is distributed across a number of computing resources. The database may also be referred to as a "shared-nothing" database if each server is only allowed to access the portions of data within its own local computing environment. Servers in a shared-nothing database environment do not share access to database information with other servers.

If a database contains large amounts of data, it may take a relatively long time to perform a query. This may have an adverse impact on the performance or response time of the database as a whole. If the database is subject to a large number of complex queries, the response time for each query may be seriously lengthened. If a view requires information from several tables or is frequently requested by users, the view may be created as a "materialized view" to improve the performance of the database. When a view is materialized, it may actually be stored as a separate table within the database. Queries may then be run against the materialized view without incurring processing time penalties for reassembling the information contained in the materialized view each time a query that may be satisfied by the materialized view is performed.

In order to make sure that the integrity of data provided by a database is maintained, the data stored in a materialized view may need to be updated when the underlying data in the base tables that affect the materialized view is changed. When changes to underlying base tables occur, the database management system ("DBMS") may create and/or update a log showing the changes. Periodically, the DBMS may use the information contained in the log to update or refresh a materialized view.

A potential problem with respect to updating materialized views may occur in a distributed, shared-nothing database environment because the timestamps associated with data stored in the log by different nodes may not be synchronized. The result may be that the logged timestamps associated with relevant updates to base table information may be out of order with respect to when the updating events actually occurred.

Errors in the synchronization of timestamps may result in several potential data coherency problems. For example, a log insert operation (resulting from an Insert, Update or Delete operation to the base table of a materialized view) that in fact occurred just after another such log insert operation by another node could potentially have an earlier timestamp. Another potential problem may occur if a refresh operation begins at a time t1. Such an operation may read all log entries with a timestamp that is less than (earlier) or equal to time t1. If a log insert operation occurs just before time t1 on another node, the corresponding log entry could have a timestamp greater than (later) time t1, and so be ignored by this refresh operation. Another potential synchronization problem may occur during a long running transaction, which may cause rows to be inserted into the log both before and after the time t1, may cause the refresh result to be transactionally inconsistent.

BRIEF DESCRIPTION OF THE DRAWINGS

Advantages of one or more disclosed embodiments may become apparent upon reading the following detailed description and upon reference to the drawings in which:

FIG. 2 is a block diagram illustrating a materialized view refresh log in accordance with embodiments of the present invention;

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
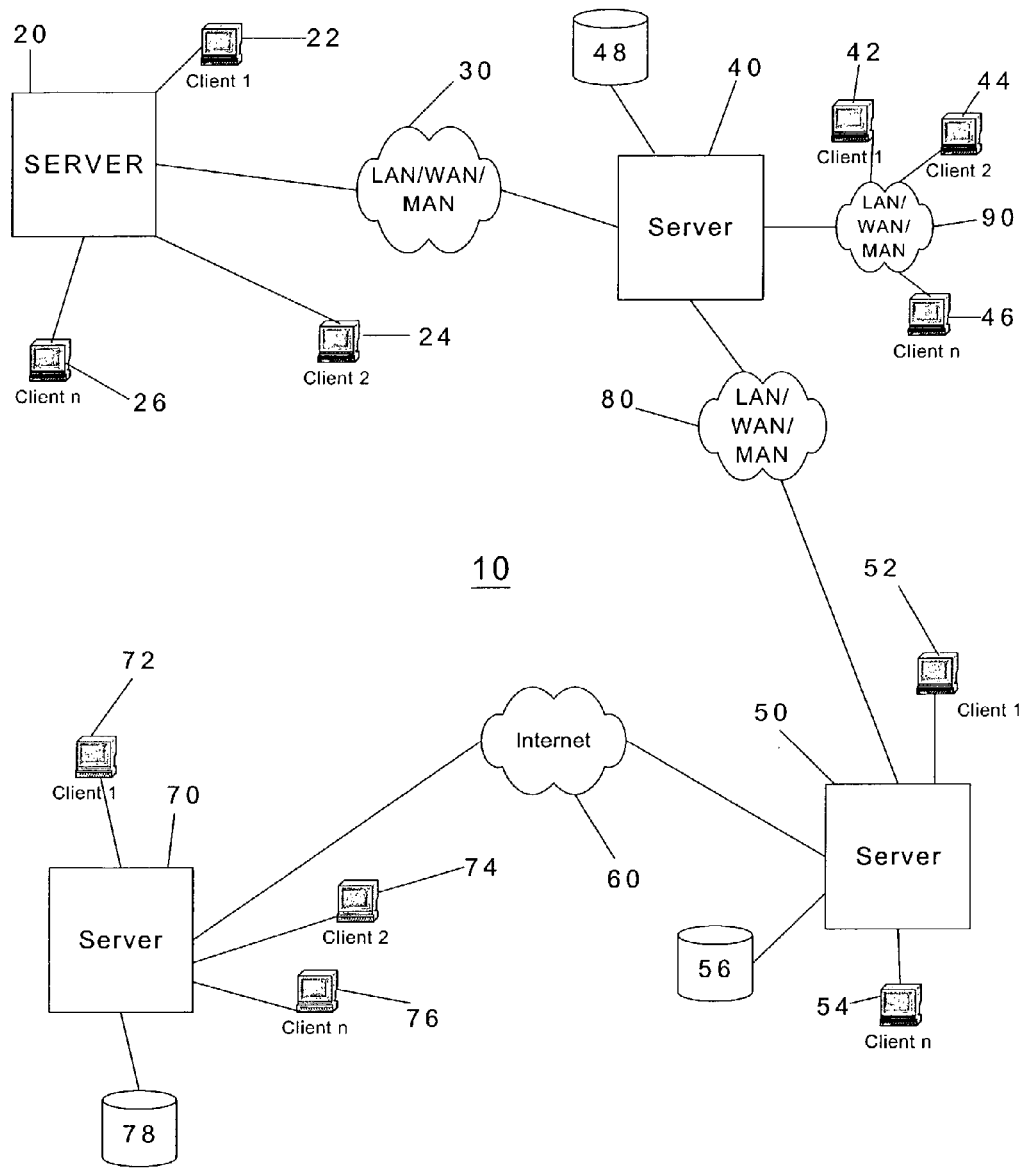
FIG. 1 is a block diagram illustrating a computer network in accordance with embodiments of the present invention.

Turning now to the drawings and referring initially to FIG. 1, a block diagram of a computer network architecture is illustrated and designated using a reference numeral 10. A server 20 may be connected to a plurality of client computers 22, 24 and 26. The server 20 may be connected to as many as "n" different client computers. Each client computer in the network 10 may be a functional client computer. The magnitude of "n" may be a function of the computing power of the server 20. If the server 20 has large computing power (for example, faster processor(s) and/or more system memory), it may be able to effectively serve a number of client computers.

The server 20 may be connected via a network infrastructure 30, which may include any combination of hubs, switches, routers, and the like. While the network infrastructure 30 is illustrated as being either a local area network ("LAN"), storage area network ("SAN") a wide area network ("WAN") or a metropolitan area network ("MAN"), those skilled in the art will appreciate that the network infrastructure 30 may assume other forms or may even provide network connectivity through the Internet. As described below, the network 10 may include other servers, which may be dispersed geographically with respect to each other to support client computers in other locations.

The network infrastructure 30 may connect the server 20 to server 40, which may be representative of any other server in the network environment of server 20. The server 40 may be connected to a plurality of client computers 42, 44, and 46. As illustrated in FIG. 1, a network infrastructure 90, which may include a LAN, a WAN, a MAN or other network configuration, may be used to connect the client computers 42, 44 and 46 to the server 40. A storage device 48 such as a hard drive, storage area network ("SAN"), RAID array or the like may be attached to the server 40. The storage device 48 may be used to store a database or portion of a database for use by other network resources. A database partition may be stored on the storage device 48 as a portion of a distributed, shared-nothing database.

The server 40 may be adapted to create log files for updating materialized views that may be stored on the storage device 48. For example, the server 40 may be adapted to identify Insert/Update or Delete operations made to base tables that affect the materialized view and create a log entry with a timestamp indicating when the operation to the base table occurred.

The server 40 may additionally be connected to server 50, which may be connected to client computers 52 and 54. A network infrastructure 80, which may include a LAN, a WAN, a MAN or other network configuration, which may be used to connect the client computers 52, 54 to the server 50. The number of client computers connected to the servers 40 and 50 may depend on the computing power of the servers 40 and 50, respectively. A storage device 56 such as a hard drive, storage area network ("SAN"), RAID array or the like may be attached to the server 50. The storage device 56 may be used to store a database or portion of a database for use by other network resources. A database partition may be stored on the storage device 56 as a portion of a distributed, shared-nothing database.

The server 50 may be adapted to create log files for updating materialized views that may be stored on the storage device 56. For example, the server 50 may be adapted to identify Insert/Update or Delete operations made to base tables that affect the materialized view and create a log entry with a timestamp indicating when the operation to the base table occurred.

The server 50 may additionally be connected to the Internet 60, which may be connected to a server 70. The server 70 may be connected to a plurality of client computers 72, 74 and 76. The server 70 may be connected to as many client computers as its computing power may allow. A storage device 78 such as a hard drive, storage area network ("SAN"), RAID array or the like may be attached to the server 40. The storage device 78 may be used to store a database or portion of a database for use by other network resources. A database partition may be stored on the storage device 78 as a portion of a distributed, shared-nothing database.

The server 70 may be adapted to create log files for updating materialized views that may be stored on the storage device 78. For example, the server 70 may be adapted to identify Insert/Update or Delete operations made to base tables that affect the materialized view and create a log entry with a timestamp indicating when the operation to the base table occurred.

Those of ordinary skill in the art will appreciate that the servers 20, 40, 50, and 70 may not be centrally located. Accordingly, the storage devices 48, 56 and 78 may also be at different locations. A network architecture, such as the network architecture 10, may typically result in a wide geographic distribution of computing and database resources.

The use of databases in a networked computing environment may be an important tool in a modern business environment. A database may be described as a collection of related records or tuples of information or data. A relational database is a popular type of database. In a relational database, a structured set of tables or relations is defined. The tables may be populated with rows and columns of data. The entire collection of tables makes up a relational database.

A database may be accessed through an application program, which may be referred to as a database management system or "DBMS." The DBMS may be a program that allows users to add new data to the database or access data that is already stored in the database. The DBMS may also perform database management functions. An access to the database may be called a "query." A query may be performed across an entire relational database and may request data from one or more tables within the database. The organization of the data requested by a query may be called a "view." Views may not exist independently within the database, but may only exist as the output from a query.

In a networked computing environment, the information stored in a database may not all be in a centralized location. Portions of data in a single relational database may be stored on different servers on different network segments, or even in different cities or countries. To make processing the information faster, a relational database may be partitioned among a number of servers to allow parallel processing of queries. The use of materialized views may also make the processing of queries more efficient.

FIG. 2 is a block diagram illustrating a materialized view update log in accordance with embodiments of the present invention. When a materialized view is created, it may be designated to be refreshed according to one of two incremental refresh policies. Those policies may be referred to as a deferred refresh policy and an immediate refresh policy.

Database tables that have one or more materialized views defined on them and that employ a deferred refresh policy may automatically maintain a log similar to the log shown in FIG. 2. The refresh operations, including maintaining and updating the refresh log, may be performed by a part of the DBMS that may be referred to as a refresh manager. In FIG. 2, a partial excerpt of a refresh log is generally identified by the reference numeral 100. Because the refresh log contains information about Insert, Update and Delete operations, the refresh log may be referred to as an IUD log. The information shown in the log excerpt 100 is an example of the information that may be included in such a log. Those of ordinary skill in the art will appreciate that various combinations of data, including additional data or subsets of the data shown may exist in actual databases.

The refresh or IUD log 100 may comprise a record column which may include an indication of the records that have been modified in a particular base table that contains data used in a particular materialized view. The record field identifies the base table row that was altered. In FIG. 2, the record column is populated with record identifiers REC 102a-REC 114a. Those of ordinary skill in the art will appreciate that the refresh or IUD log 100 may contain multiple entries to the same base table row if that row has been altered more than once. A timestamp column contains timestamps indicative of the time at which the corresponding record in the base table was inserted, updated, or deleted. The timestamps are identified by the reference numerals TS 102*b*-TS 114*b* in FIG. 2. As set forth above, the timestamps may not be correctly synchronized because they may have been generated by different nodes in a distributed, shared-nothing database environment. In such a system, various components of a base table may be distributed in partitions that are located on a number of different computing nodes, as illustrated in FIG. 1.

The refresh or IUD log 100 may include an update type column that may contain data indicative of the type of update that was performed on the base table. The update type information may be useful in determining how to update associated materialized views when a refresh operation is performed. The update type column in FIG. is populated with data elements identified as UT 102*c*-UT 114*c*.

The refresh log or IUD log 100 may include a column indicative of the data that was added or modified in the base table row associated with the corresponding record identifier. These data elements are identified as data 102*d*-data 114*d* in FIG. 2. If the update type in the update type column indicates that the record was deleted from the base table, the data element for that record may be populated with a bogus value.

Each record of the refresh or IUD log 100 may also include an epoch number, which is referred to as E 102*e*-E 114*e* in FIG. 2. The epoch number, which is not a version number or timestamp, may be used to identify a group records that have been added to the refresh or IUD log 100 since a previous refresh operation was performed. A potential problem with refreshing materialized views may relate to the synchronization between the refresh or IUD log 100 and the actual performance of the refresh operation. The use of the epoch number may help to address this problem by avoiding inclusion of records corresponding to transactions that occurred outside a refresh time range or omitting records corresponding to transactions that actually occurred within a particular refresh time range.

Each base table may have a single epoch number that may be stored as part of the metadata information of the database. Metadata is data stored with the database that relates to the organizational structure and operation of the database. The epoch number may also be visible as part of the runtime information for the associated table, much like the security attributes and last redefinition timestamp of the table. That information may reside in system memory during execution.

When log entries are created in the refresh or IUD log 100 (FIG. 2), the current epoch number may be read from the runtime information of the table and written to the log record. When completed, each entry in the refresh log or IUD log 100 may comprise a record that includes a record identifier (e.g Record 102*a*), a timestamp (e.g. TS 102*b*), an update type (e.g. UT 102*c*), a data element (Data 102*d*) and an epoch number (E 102*e*).

The refresh manager may be responsible for implementing a refresh algorithm, which actually performs the task of updating materialized views based on the data contained in the refresh or IUD log 100. In addition, the refresh log may perform other functions in association with refresh operations, such as managing the epoch number for base tables and the like. When a refresh operation on a materialized view is anticipated, the refresh manager may first lock the corresponding base table, then increment the associated epoch number. After the epoch number is incremented, the lock may be released and the refresh algorithm may be performed by the refresh manager. Locking the base table while the epoch number is incremented may assure that no transaction that has already written to the log is still active and holding locks of its own on the same table. Because the epoch increment operation is typically performed quickly, the lock during the increment operation has very little effect on the execution of other transactions. By explicitly controlling the epoch number with the refresh manager, the epoch number may be the same for all the nodes participating in the database. Accordingly, the changing of the epoch number may not be affected by timestamp inaccuracies.

When the epoch number is incremented, it is updated in the metadata tables for the database, as well as in the runtime information of the table. The updated information may be immediately reflected in the system memory of the relevant node. In this manner, the revised epoch number may be made available to statements that may have the table already open. Those statements may get the new epoch number without an additional disk access.

A potential problem in accurately maintaining materialized views may involve synchronization between the refresh or IUD log 100 and the performance of the refresh operation. The use of the epoch number may help to avoid this problem by helping to clearly differentiate between rows of the refresh or IUD log 100 that were inserted into the log as part of transactions that happened before the refresh operation started, and rows that correspond to transactions that happened after the refresh operation started. The inclusion of correct refresh data helps to ensure that materialized views drawn from the base table are correctly updated and remain in a transactionally consistent state.

As set forth above, each base table in a database may have a separate refresh or IUD log, such as the refresh or IUD log 100, associated therewith. This means that the entries in the log may be associated with the base table rather than the materialized view that is to be refreshed. The log 100 may contain entries that apply to more than one materialized view. The creation of the refresh or IUD log 100 may be done automatically whenever an Insert, Update or Delete operation is performed on the base table.

Refresh operations to materialized views may be defined to occur at periodic intervals. When a refresh operation begins, it may record the current state of the refresh or IUD log 100. The current state of the refresh or IUD log 100 may include an identification of the last row or record that had been inserted into the refresh or IUD log 100 at a particular time (for example, the time of the beginning of the refresh operation). The refresh operation may read the refresh or IUD log 100 only up to that particular row during the current refresh operation. Additional rows may be inserted into the log during the execution of the refresh operation, and the next refresh operation should start at the row inserted into the refresh or IUD log 100 immediately after the last entry included in the previous refresh operation. A failure to accurately record which row in the log was the last one read by a certain refresh operation may result in the incorrect refreshing of one or more materialized views. Errors in data stored in materialized views could occur if log rows or records are used by more than one refresh operation or if rows are skipped altogether.

The use of the timestamp in the records of the refresh or IUD log 100 may contribute to erroneous updating of materialized views if the timestamps are used to determine which records referred to by the refresh or IUD log 100 are used for a particular refresh operation. Separate from the above-mentioned problem with synchronization between the refresh or IUD log and the actual performance of the update operation, the problem of time stamp synchronization may relate to synchronization between the base tables and the corresponding refresh or IUD log. Reliance on a timestamp alone to synchronize logging and refresh operations can therefore cause correctness problems with materialized views that are refreshed.

The synchronization between the base table and the refresh or IUD log may be addressed by co-locating the refresh or IUD log 100 with its base table. This means that the partitioning scheme for the refresh or IUD log 100 may be the same as that of its base table. For example, in the database environment shown in FIG. 1, the refresh or IUD log associated with the portions of the base table stored in a partition on the storage device 48 may also be stored on the storage device 48. Similarly, portions of the refresh or IUD log corresponding to base table portions stored in partitions on the storage devices 56 and 78 may be respectively stored on those storage devices.

By co-locating the portion of the refresh or IUD log 100 with the relevant portion of the base table, all the refresh log records corresponding to a given portion of the base table will be on the same data volume as the corresponding base table data even though the entire base table may span several volumes. Accordingly, both the refresh log and the corresponding base table portion may be maintained by the same disk process. A disk process may be an operating system process that manages all the I/O requests for a particular disk. The timestamps written to the refresh or IUD log for each portion of a base table may, accordingly, be consistent.

Figure 3:
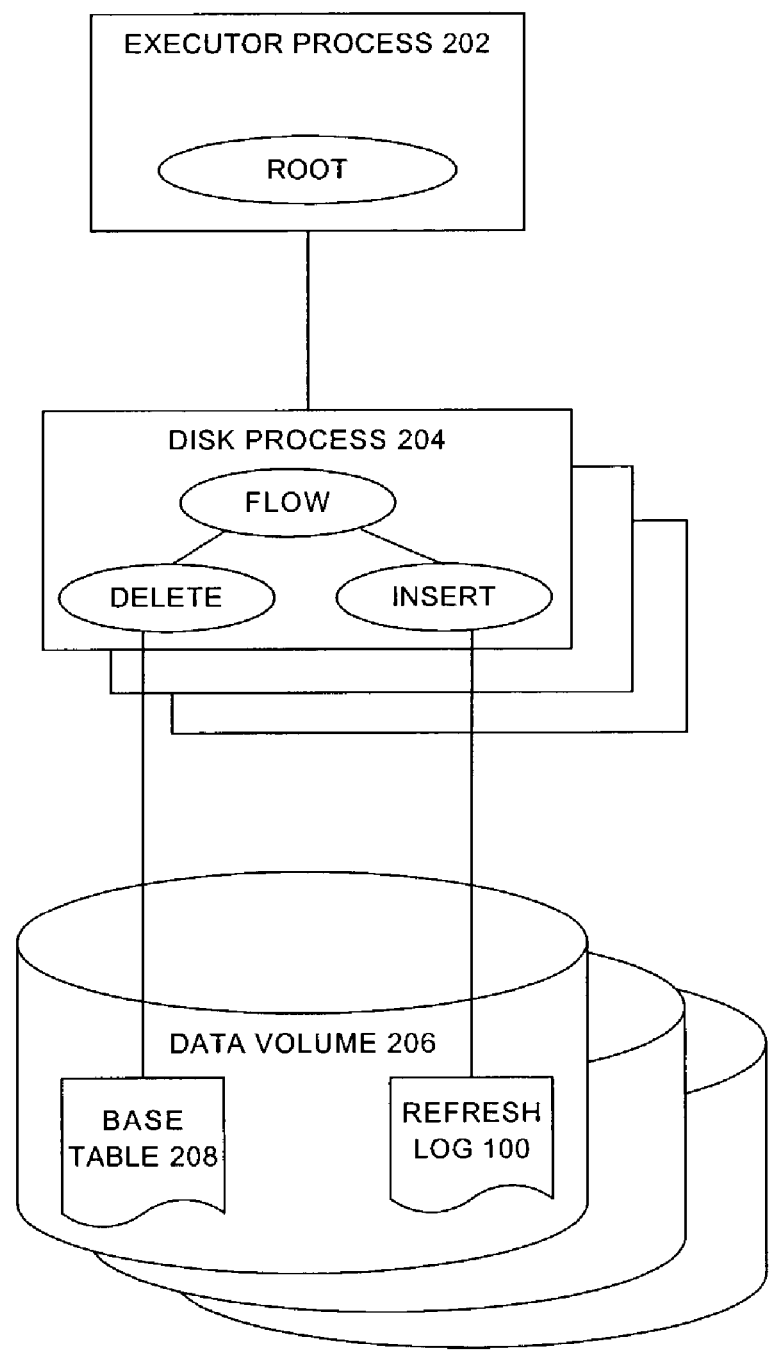
FIG. 3 is a block diagram that is useful in explaining the refreshing of a materialized view in a computer system in accordance with embodiments of the present invention.

FIG. 3 is a block diagram that is useful in explaining the refreshing of a materialized view in a computer system in accordance with embodiments of the present invention. The diagram is generally referred to by the reference numeral 200. The DBMS associated with a database may comprise an executor process 202, which may execute on a first node. The executor process may include refresh manager functionality. The first node may correspond to one of the servers 40, 50 or 70 (FIG. 1). A disk process 204 may execute on the same node and may service a data volume 206. The data volume 206 may correspond to the storage devices 48, 56 or 78 (FIG. 1). The data volume stores a base table segment 208 and the same data volume 206 also stores the corresponding portion of the refresh or IUD log 100.

If a delete operation is performed on the base table 208, the flow operator of the disk process 204 may also update the refresh or IUD log 100 by inserting a new entry therein. If the delete operation affects several partitions, than the disk process for each of those partitions may execute the work in parallel. The data does not have to cross process boundaries and go through the main executor process. If the base table 208 is not co-located with the refresh or IUD log 100, the delete operation to the base table 208 and the corresponding insert operation on the refresh log 100 would not be performed by the same disk process 204 and synchronization errors of timestamp values could potentially occur.

Co-location of the refresh log 100 with a corresponding base table portion may also provide benefits when range logging operations are performed. If a range of inserted data spans more than a single partition, synchronization errors may cause the timestamp on a row in one partition in the beginning of the range to be greater than that of some other row at another partition at the end of the range. This error may cause problems for a range analysis algorithm that is used to perform range logging. Additionally, for each range R, the refresh operation cannot be performed accurately without knowledge of other range and single row operations that affected rows inside R, happened before R was inserted, and which happened after R was inserted. If a range spans several partitions in which the timestamps are not synchronized, determining the actual order of these events may be difficult.

Co-location of the refresh log 100 with its corresponding base table portion 208 avoids these potential problems when ensuring that logged ranges never cross partition boundaries. Large bulk insert operations may be divided to several logged ranges, each one in a single partition. By making sure that all the rows of a range are inserted into the same partition, and therefore handled by the same disk process, the timestamps entered into the refresh or IUD log 100 may be ordered correctly.

Figure 4:
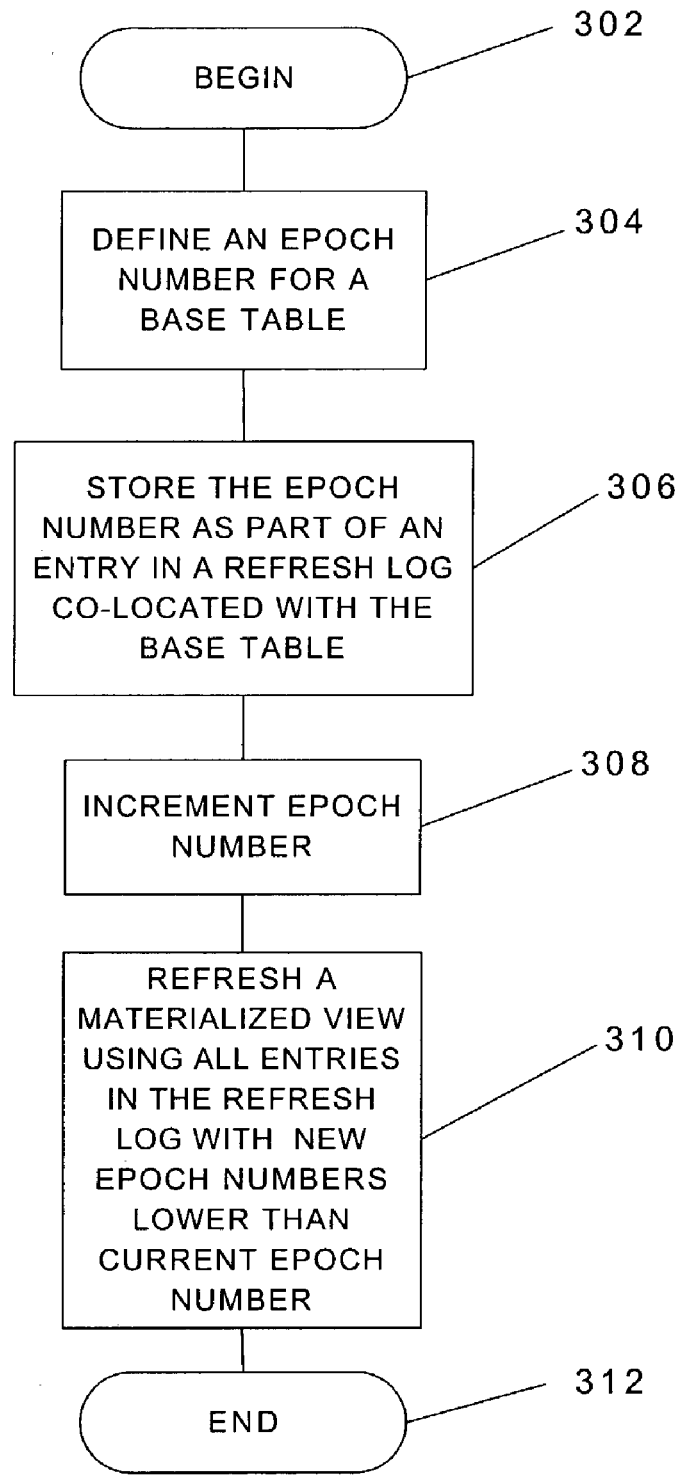
FIG. 4 is a process flow diagram that is useful in explaining the operation of embodiments of the present invention.

FIG. 4 is a process flow diagram that is useful in explaining the operation of an embodiment of the present invention. The process is generally referred to by the reference numeral 300. At block 302, the process begins.

At block 304, an epoch number is defined for a particular base table. The epoch number may be created as described above with respect to FIG. 2. At block 306, the epoch number is stored as a constituent part of an entry in a refresh or IUD log, such as the refresh or ID log 100 (FIG. 2 and FIG. 3). As set forth above with respect to FIG. 3, the refresh or IUD log may be co-located with the base table to which the entry in the refresh or IUD log corresponds. Co-location of the refresh or IUD log with the corresponding portion of the base table allows updates to the refresh or IUD log to be performed by the same disk process that performs operations on the base table itself.

At block 308, the epoch number is incremented in anticipation of performing a refresh operation on one of the materialized views that is defined on the base table. At block 310, the materialized view is updated with information contained in all the entries from the refresh or IUD log that correspond to epoch numbers that have been added since the materialized view was last refreshed. This means that materialized views defined on the base table may be refreshed at different increments and need not be refreshed for each individual epoch number. The refresh manager may store a vector containing the epoch numbers to include in a given refresh operation in the metadata of each materialized view defined on the base table. At block 312, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for refreshing a table to produce a refreshed table, the system comprising:
a refresh log that contains a plurality of entries, each of the plurality of entries comprising an epoch identifier, wherein the epoch identifier identifies a subset of the plurality of entries that have been added to the refresh log since a previous refresh operation on the table, wherein the epoch identifier is adapted to synchronize refresh operations applied to network-distributed elements of the table with refresh operations applied to the refresh log; and
a refresh manager that performs a refresh operation on the table using entries that have corresponding epoch identifiers, wherein the refresh manager is configured to increment the epoch identifier before performing the refresh operation.

2. The system for refreshing the table set forth in claim 1, wherein the corresponding epoch identifiers represent epoch numbers that have been created since the previous refresh operation on the table.

3. The system for refreshing the table set forth in claim 1, wherein the refresh manager changes the epoch identifier in association with a refresh operation.

4. The system for refreshing the table set forth in claim 1, wherein the entries relate to updates performed on a base table on which the refreshed table is based.

5. The system for refreshing the table set forth in claim 4, wherein the base table and the refresh log are co-located on common partitions.

6. The system for refreshing the table set forth in claim 4, wherein the refresh manager locks the base table and changes the epoch identifier in association with a refresh operation.

7. The system for refreshing the table set forth in claim 1, wherein the epoch identifier is stored as metadata for a database.

8. The system for refreshing the table set forth in claim 1, wherein the epoch identifier is visible as runtime information for a base table upon which the refreshed table is based.

9. The system for refreshing the table set forth in claim 1, wherein the refreshed table is a materialized view.

10. The system for refreshing the table set forth in claim 1, wherein the table comprises at least a portion of a distributed, shared-nothing database.

11. A tangible machine readable medium storing information, the tangible medium comprising:
a base table;
a refresh log that contains a plurality of entries, each of the plurality of entries corresponding to an update that was made to the base table; and
code adapted to perform the updates to the base table by a process that also places entries into the refresh log, wherein each of the plurality of entries comprises an epoch identifier that identifies a subset of the plurality of time entries that have been added to the refresh log since a previous refresh operation on the table, wherein each of the plurality of entries in the subset has the same epoch identifier, and wherein the epoch identifier is adapted to synchronize refresh operations applied to network-distributed elements of the table with refresh operations applied to the refresh log.

12. The tangible medium set forth in claim 11, wherein the refresh log is created because the base table has a materialized view defined thereon.

13. The tangible medium set forth in claim 11, wherein the base table comprises at least a portion of a distributed, shared-nothing database.

14. A computer network, comprising:
a plurality of computer systems coupled for communication with each other, each of the plurality of computer systems comprising a partition that stores a portion of a base table and a refresh log, the refresh log containing a plurality of entries, each of the plurality of entries comprising an epoch identifier, wherein the epoch identifier identifies a subset of the plurality of entries that have been added to the refresh log since a previous refresh operation on the base table, and wherein the epoch identifier is adapted to synchronize refresh operations applied to network-distributed elements of the table with refresh operations applied to the refresh log; and
a refresh manager that performs a refresh operation on the base table to provide a refreshed base table using entries that have corresponding epoch identifiers, wherein the refresh manager is configured to increment the epoch identifier before performing the refresh operation.

15. The computer network set forth in claim 14, wherein the corresponding epoch identifiers represent epoch numbers that have been created since the previous refresh operation on the table.

16. The computer network set forth in claim 15, wherein the refresh manager changes the epoch identifier in association with a refresh operation.

17. The computer network set forth in claim 15, wherein the entries relate to updates performed on the portion of the base table stored on the same partition as the refresh log that contains the refresh information.

18. The computer network set forth in claim 15, wherein the refresh manager locks the base table and changes the epoch identifier in association with a refresh operation.

19. The computer network set forth in claim 15, wherein the epoch identifier is stored as metadata for a database.

20. The computer network set forth in claim 15, wherein the epoch identifier is visible as runtime information for the base table.

21. The computer network set forth in claim 15, wherein the refreshed table is a materialized view.

22. The computer network set forth in claim 15, wherein the base table comprises at least a portion of a distributed, shared-nothing database.

23. A method of updating a table to produce a refreshed table, the method comprising:
locking a base table that contains information on which the table is based;
incrementing an epoch identifier associated with the base table from a first value to a second value while the base table is locked;
unlocking the base table;
storing the epoch identifier as part of an entry in a refresh log, wherein the epoch identifier identifies the entry as one of a plurality of entries that have been added to the refresh log since a previous refresh operation on the table, and wherein the epoch identifier is adapted to synchronize refresh operations applied to network-distributed elements of the table with refresh operations applied to the refresh log; and
refreshing the table to produce the refreshed table using the entries in the refresh log that have epoch identifiers of the first value.

24. The method of updating the table set forth in claim 23, comprising creating the refreshed table using data corresponding to epoch numbers that have been created since the previous refresh operation on the table.

25. The method set forth in claim 23, comprising storing the base table and the refresh log on a common partition.

26. The method set forth in claim 23, comprising creating a materialized view based on the table.

27. The method set forth in claim 23, comprising changing the epoch identifier in association with a refresh operation.

28. The method set forth in claim 23, comprising locking the base table and changing the epoch identifier in association with a refresh operation.

29. The method set forth in claim 23, comprising storing the epoch identifier as metadata for a database.

30. The method set forth in claim 23, comprising making the epoch identifier visible as runtime information for the base table.

* * * * *